US012561565B2

(12) United States Patent (10) Patent No.: US 12,561,565 B2
Pokorny et al. (45) Date of Patent: Feb. 24, 2026

(54) MODEL DEPLOYMENT AND OPTIMIZATION BASED ON MODEL SIMILARITY MEASUREMENTS

(71) Applicant: Red Hat, Inc., Raleigh, NC (US)

(72) Inventors: Fridolin Pokorny, Brno (CZ); Christoph Goern, Grasbrunn (DE)

(73) Assignee: Red Hat, LLC, Raleigh, NC (US)

( * ) Notice: Subject to any disclaimer, the term of this patent is extended or adjusted under 35 U.S.C. 154(b) by 1063 days.

(21) Appl. No.: 17/331,383

(22) Filed: May 26, 2021

(65) Prior Publication Data

US 2022/0383122 A1 Dec. 1, 2022

(51) Int. Cl.
| G06F 3/048 | (2013.01) |
| G06F 16/906 | (2019.01) |
| G06F 17/16 | (2006.01) |
| G06N 3/043 | (2023.01) |
| G06N 3/082 | (2023.01) |

(52) U.S. Cl.
CPC ........... G06N 3/082 (2013.01); G06F 16/906 (2019.01); G06F 17/16 (2013.01); G06N 3/043 (2023.01)

(58) Field of Classification Search
CPC ...... G06N 3/082; G06N 3/043; G06N 3/0985; G06N 3/084; G06N 3/08; G06F 16/906; G06F 17/16; G06F 17/15
USPC ......................................................... 706/15
See application file for complete search history.

(56) References Cited

U.S. PATENT DOCUMENTS

| 8,065,244 B2 | 11/2011 | Chen et al. | |
| 10,089,383 B1 * | 10/2018 | Mackay | ................ G06F 16/335 |

| 10,685,295 B1 * | 6/2020 | Ross | ...................... G06N 20/00 |
| 10,747,740 B2 | 8/2020 | Majumdar | |
| 2017/0132513 A1 | 5/2017 | Yu et al. | |
| 2018/0314975 A1 * | 11/2018 | Zang | ...................... G06N 20/20 |
| 2019/0155684 A1 * | 5/2019 | Akutsu | ................... G06F 3/067 |
| 2019/0294999 A1 * | 9/2019 | Guttmann | ............. G06F 18/217 |
| 2019/0347549 A1 | 11/2019 | Phanishayee et al. | |
| 2021/0019652 A1 * | 1/2021 | Gadelrab | ............ G06F 11/3447 |

(Continued)

FOREIGN PATENT DOCUMENTS

| CN | 110782043 A * | 2/2020 | ............. G06N 20/00 |

OTHER PUBLICATIONS

Learning to Hash for Indexing Big Data—A Survey; Wang et al.; Proceedings of the IEEE/ vol. 104 No. 1, Jan. 2016 (24 pages).

(Continued)

*Primary Examiner* — Mohamed Abou El Seoud

(74) *Attorney, Agent, or Firm* — Kilpatrick Townsend & Stockton LLP

(57) ABSTRACT

Methods and systems for optimizing models for deployment based on similar models. In one embodiment, a method is provided that includes receiving a model for deployment in a computing environment and extracting a plurality of operations from the model. The operations may be categorized based on predefined operation categories to form categorized operations and a model summary score may be calculated based on the categorized operations. A similar model may be identified with a similar model summary score to the model similarity score of the model. The model may be updated based on an optimization operation performed on the similar model and the model may be deployed within the computing environment.

20 Claims, 5 Drawing Sheets

(56)                    References Cited

U.S. PATENT DOCUMENTS

2021/0043074 A1* 2/2021 Hu ..................... G06F 18/2155

OTHER PUBLICATIONS

Semi-Supervised Hashing for Large-Scale Search; Wang et al.; IEEE Transactions on Pattern Analysis and Machine Intelligence, vol. 34, No. 12, Dec. 2012; pp. 2393-2406.
Gist: Efficient Data Encoding for Deep Neural Network Training; Jain et al.; http://www.cs.toronto.edu/ecosystem/papers/ISCA18/Gist. pdf; retrieved Feb. 10, 2021(14 pages).
HashNet: Deep Learning to Hash by Continuation; Cao et al.; https://openaccess.thecvf.com/content ICCV 2017/papers/Coa HashNet Deep Learning ICCV 2017 paper.pdf; retrieved Feb. 10, 2021; pp. 5608-5617.
Google AI Blog: Introducing Model Search: An Open Source Platform for Finding Optimal ML Models; Mazzawi et al.; https:// ai.googleblog.com/2021/02/introducing-model-search-open-source. html; Feb. 19, 2021.

* cited by examiner

400

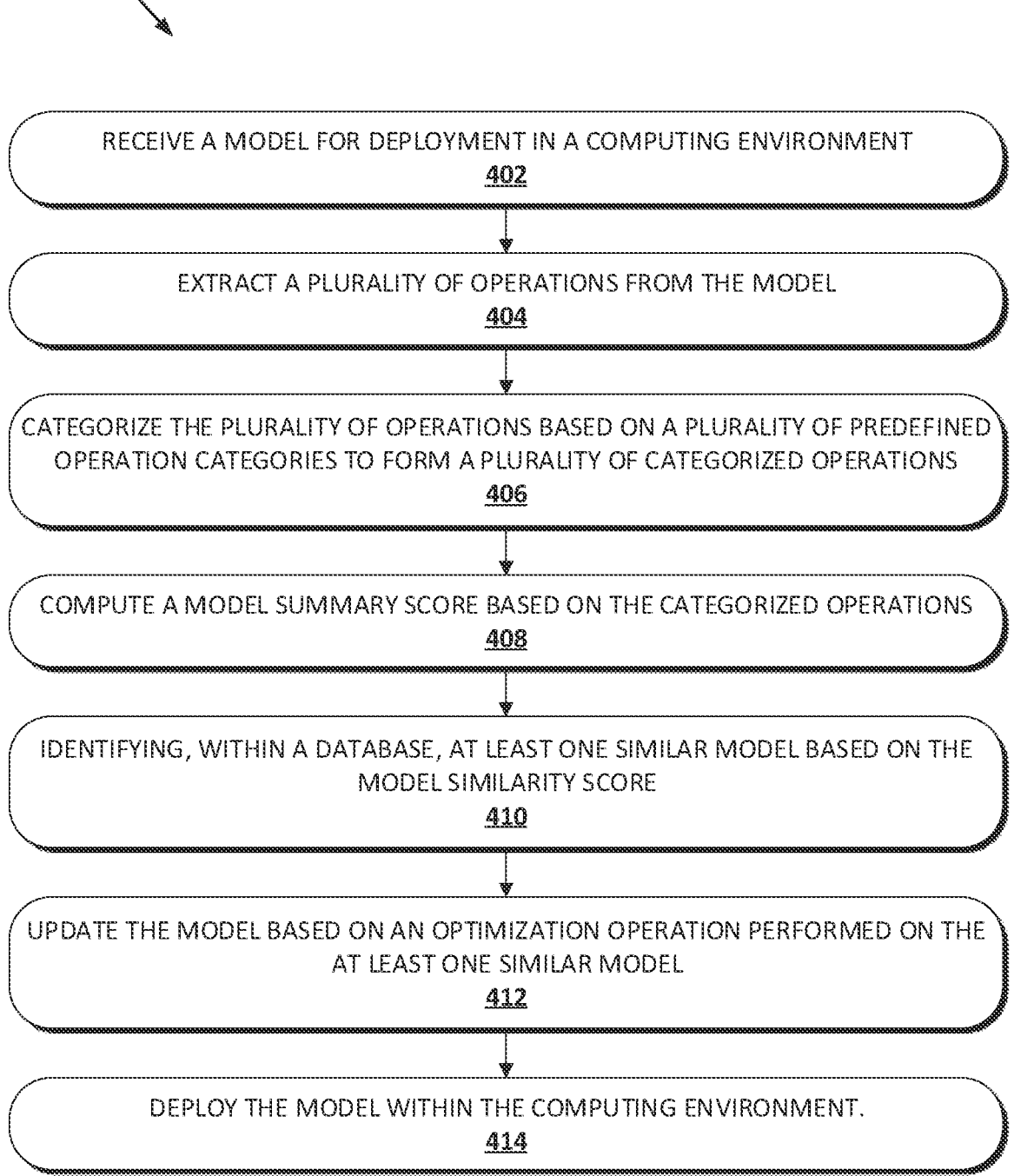

RECEIVE A MODEL FOR DEPLOYMENT IN A COMPUTING ENVIRONMENT
402

EXTRACT A PLURALITY OF OPERATIONS FROM THE MODEL
404

CATEGORIZE THE PLURALITY OF OPERATIONS BASED ON A PLURALITY OF PREDEFINED OPERATION CATEGORIES TO FORM A PLURALITY OF CATEGORIZED OPERATIONS
406

COMPUTE A MODEL SUMMARY SCORE BASED ON THE CATEGORIZED OPERATIONS
408

IDENTIFYING, WITHIN A DATABASE, AT LEAST ONE SIMILAR MODEL BASED ON THE MODEL SIMILARITY SCORE
410

UPDATE THE MODEL BASED ON AN OPTIMIZATION OPERATION PERFORMED ON THE AT LEAST ONE SIMILAR MODEL
412

DEPLOY THE MODEL WITHIN THE COMPUTING ENVIRONMENT.
414

FIG. 4

MODEL DEPLOYMENT AND OPTIMIZATION BASED ON MODEL SIMILARITY MEASUREMENTS

BACKGROUND

Predictive models, such as machine learning models, may be trained based on various data sets to perform one or more functions. Once the models are trained, they may be deployed in a computing environment, such as a distributed computing environment. The deployed models may then receive and process new operational data to perform their trained functions.

SUMMARY

The present disclosure presents new and innovative systems and methods for optimizing models for deployment based on similar models. In one embodiment, a method is provided that includes receiving a model for deployment in a computing environment and extracting a plurality of operations from the model. The method may also include categorizing the plurality of operations based on a plurality of predefined operation categories to form a plurality of categorized operations. A model summary score may be computed based on the categorized operations. The method may further include identifying, within a database, at least one similar model with a similar model summary score and updating the model based on an optimization operation performed on the at least one similar model. The model may then be deployed within the computing environment.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 4 illustrates a method for optimizing models based on model similarity measurements according to an exemplary embodiment of the present disclosure.

DETAILED DESCRIPTION OF EXAMPLE EMBODIMENTS

Trained models often have to be optimized before they can be deployed. In practice, a trained model may represent a series of operations (e.g., computational operations) that are performed on received data. Training the model may change or configure the operations performed in order to maximize the model's accuracy for a particular operation (e.g., for making a particular type of prediction). Certain operations may be computationally expensive, however, which may increase the cost of using the model and/or may increase the model's latency in responding to received data.

To improve the performance of deployed models, trained models are often optimized to perform better once deployed. In particular, certain operations in a model may be added, removed, substituted, or altered (e.g., reconfigured) to reduce the computing resources used by the model. However, this process is typically done manually by a technician and is based on the specific architecture of the model (e.g., the specific type and arrangement of operations within the model). This can result in inaccuracies in how the models are optimized and may reduce the overall number of models that are optimized in a given system, which further increases the computing resources used. Automating this process has been problematic because removing and consolidating specific steps or operations in a model without negatively impacting the model's accuracy is highly model-specific, and most heuristics struggle to identify steps that can be removed or consolidated. Therefore, there exists a need to automatically optimize trained models before deployment.

One solution to this problem is to optimize a received model based on optimization operations that were applied previously to similar models. To do this, a model summary score may be calculated for the received model and may be used to identify similar models (e.g., models with similar operations and/or similar structures) that have been previously deployed. The model summary score may be calculated based on categorized operations for the received model. In particular, operations may be extracted from the model and categorized according to predefined operation categories. The model summary score may then be calculated based on the categorized operations (e.g., based on the number of operations in the categories) and used to identify one or more similar models. The received model may then be updated based on optimization operations that were used to optimize the similar model and the model may then be deployed within the computing environment.

Figure 1:
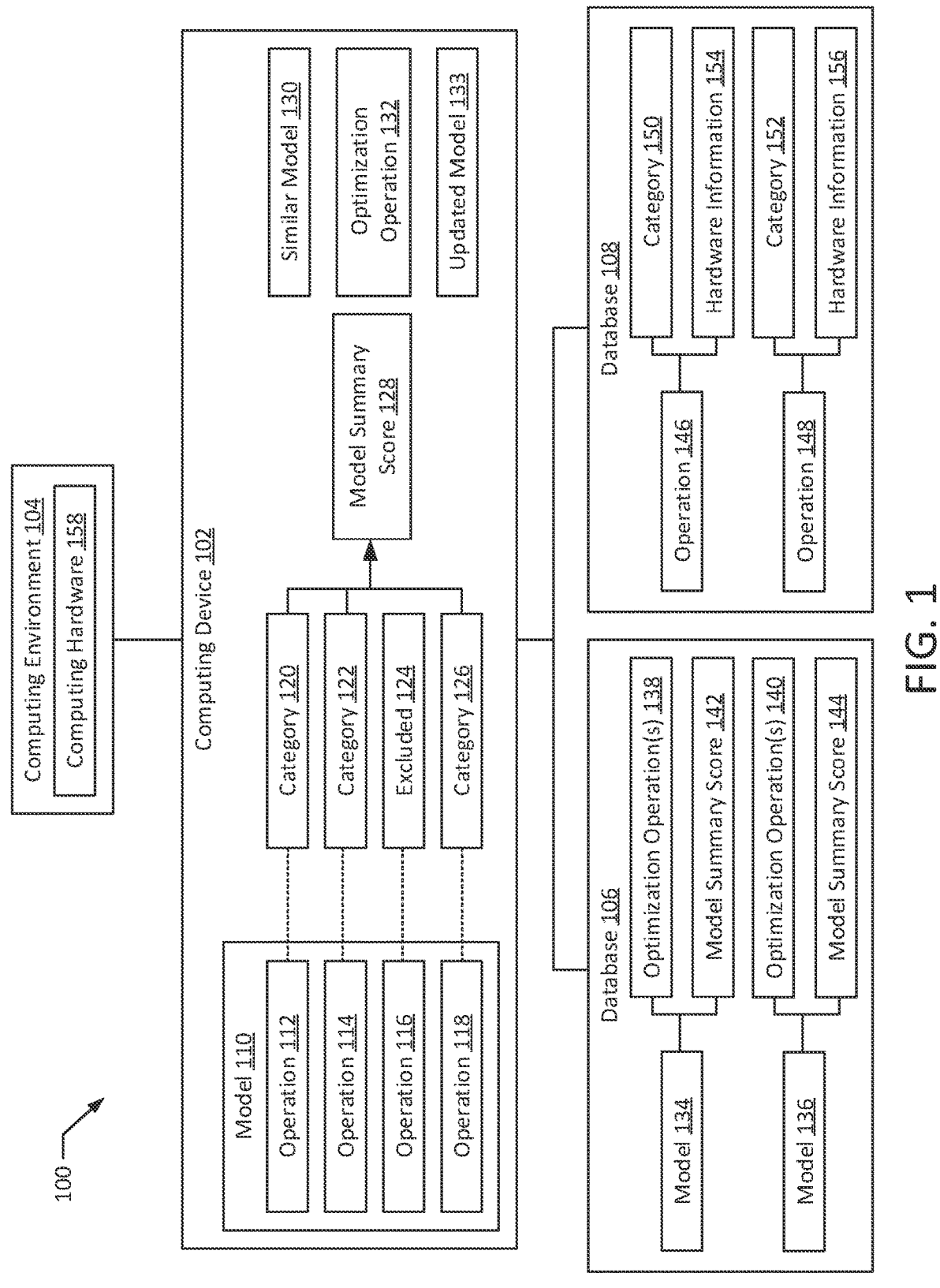
FIG. 1 illustrates a system for model optimization according to an exemplary embodiment of the present disclosure.

FIG. 1 illustrates a system 100 for model optimization according to an exemplary embodiment of the present disclosure. The system 100 includes a computing device 102, a computing environment 104, and database 106, 108. The computing environment 104 may be configured to receive and run software applications, such as predictive models, cloud computing applications, and the like. In particular, the computing environment 104 includes computing hardware 158, which may be used to execute received applications. For example, the computing hardware 158 may include one or more memories, storage devices, CPUs, GPUs, FPGAs, and the like. In certain instances, the computing hardware 158 may include specialized hardware for use in training or deploying predictive models. For example, the computing hardware 158 may include one or more GPUs, which may be used to train predictive models. As another example, the computing hardware 158 may include one or more ASICs configured to efficiently perform certain types of computing operations for deployed models. As one specific example, the computing hardware 158 may include tensor processing units (TPUs) configured to efficiently execute computing operations provided by Google's® TensorFlow APIs. The computing environment may be a distributed computing environment, such as a cloud computing environment, and may include computing hardware 158 in different locations (e.g., different geographic locations).

The computing device 102 may be configured to receive models for deployment within the computing environment 104 and to update those models to optimally perform within the computing environment 104. In particular, the computing device 102 may receive a model 110 and may be configured to generate an updated model 133 that has been optimized for deployment within the computing environment 104. The model 110 may be received as source code and/or a compiled executable of a predictive model that has been trained to perform one or more functions. For example, the model 110 may include one or more of a supervised learning model, an unsupervised learning model, a reinforcement learning model, a linear regression model, a decision tree model, a random forest model, a neural network model, a naive Bayes model, a logistic regression model, and the like. In particular, the model 110 may include multiple operations 112, 114, 116, 118 that are performed to computationally process received data to perform the model's 110 trained functions. In particular, training the model 110 may include adding, removing, and/or adjusting the operations 112, 114, 116, 118.

To optimize the model 110, the computing device 102 may generate a model summary score 128 for the model 110. In particular, the model summary score 128 may be calculated based on the types of operations 112, 114, 116, 118 included within the model 110. For example, the computing device 102 may extract the operations 112, 114, 116, 118 from the model 110. For example, where the model 110 is received as source code, the computing device 102 may identify function calls within the source code as corresponding operations 112, 114, 116, 118. In particular, the function calls may be identified according to one or more keyword searches, sequence recognizers, and the like. Information about the operations 112, 114, 116, 118, such as function type, function library, data input, and the like may be extracted from the model 110 (e.g., from the source code, during a backpropagation stage, during an inference stage). Additionally or alternatively, resource utilization information for particular operations 112, 114, 116, 118 may be reported by computing hardware (e.g., computing processors, memory, storage, and the like).

The computing device 102 may determine categories for the extracted operations 112, 114, 116, 118. For example, the computing device 102 may assign a category 120, 122, 126 to one or more of the operations 112, 114, 118 identified within the model 110. The categories 120, 122, 126 may be assigned based on predefined operation categories. For example, the predefined operation categories may include one or more types of neural network neurons used, types of connections between neural network neurons, one-dimensional convolution operations, two-dimensional convolution operations, matrix manipulations (e.g., matrix addition, matrix multiplication), mathematical CPU instructions, types of optimizer steps, and the like. In certain implementations, the categories 120, 122, 126 may be assigned based on data stored within a database 108. For example, the database 108 stores information regarding operations 146, 148, including categories 150, 152 and hardware information 154, 156. For example, the categories 150, 152 and the hardware information 154, 156 may be stored as metadata for the operations 146, 148. The operations 146, 148 may correspond to particular, individual function calls that a model 110 that has been trained may call in operation and the categories 150, 152 may identify a type of operation performed. For example, the operation 146 may correspond to an API call to a TensorFlow two-dimensional convolution function and the operation 148 may correspond to an API call to a different software library's matrix multiplication function. In such an example, the category 150 may identify the operation 146 as a "Convolution Operation" and/or a "Two-Dimensional Convolution Operation" and the category 150 may identify the operation as a matrix multiplication function. As explained in greater detail below, one or more categories 120, 122, 126, 150, 152 may correspond to the same operation 112, 114, 118, 146, 148 at different levels of abstraction. In certain implementations, more than one category 120, 122, 126, 150, 152 may be assigned to the same operation 112, 114, 118, 146, 148 at different levels of abstraction (e.g., to calculate multiple model summary scores 128). In certain implementations, the categories 120, 122, 124, 126 may be determined based on a database storing the operations 112, 114, 116, 118. For example, multiple databases may store the operations 112, 114, 116, 118, 146, 148, instead of a single database 108, and each of the multiple databases may correspond to one or more different categories 120, 122, 124, 126, 150, 152. In additional or alternative implementations, categories 150, 152 may be stored in a separate database from the hardware information 154, 156.

In certain implementations, the computing device 102 may also identify one or more operations 116 within the model 110 as excluded from the model summary score 128. To do so, the computing device 102 may assign an excluded status 124 to the operation 116. The computing device 102 may identify operations 116 as excluded based on the computing hardware 158 of the computing environment 104. For example, certain types of operations 116 may be compiled or otherwise configured to execute using minimal computing resources and/or processing time of the computing hardware 158 of the computing environment 104. For example, if the computing hardware 158 includes one or more TPUs and the operation 116 is a function call to a TensorFlow API, the operation 116 may use minimal processing time when performed by the TPU. Accordingly, the operation 116 may not need to be processed or optimized to improve the overall performance of the model 110 within the computing environment 104. Operations 116 that can be excluded from the model summary score 128 may be identified based on information stored within a database 108. For example, in addition to categories 150, 152, the database 108 may also store hardware information 154, 156 that identifies computing hardware that can execute the operations 146, 148 with minimal computing resources and/or processing time. Continuing the previous example, hardware information corresponding to the operation 116 within the database 108 may indicate that the operation 116 can operate on TPUs with minimal processing time. Based on this hardware information, the computing device 102 may identify an excluded status 124 for the operation 116. In certain implementations, the categories 150, 152 and hardware information 154, 156 may be stored within the same database 108, as depicted. However, in additional or alternative implementations, the system 100 may include separate databases storing the categories 150, 152 and the hardware information 154, 156.

The computing device 102 may then calculate a model summary score 128 for the model 110. The model summary score 128 may be calculated at least in part based on the categories 120, 122, 126 assigned to the operations 112, 114, 118. In particular, the model summary score 128 may be calculated based on the quantity (or weighted quantity) of operations 112, 114, 118 assigned to each of the predefined categories. As explained further below, the model summary score 128 may be calculated as a hash (e.g., a fuzzy hash) of the quantities of operations within the model 110 in different categories. For example, the model summary score 128 may be calculated as a fuzzy hash of sequential blocks of a method (e.g., a hash formed by appending sequential hash for each operation in the trained model). Additionally or alternatively, where a graph representation of the model 110 is available, the model summary score 128 may be calculated based on a graph convergence analysis of the graph representation. In still further implementations, the model summary score 128 may be calculated according to one or more of a Jaccard similarity measure, a cosine similarity measure, a Pearson similarity measure, and the like.

The computing device 102 may then identify a similar model 130 based on the model summary score 128. The similar model 130 may be identified within a database 106. For example, the database 106 stores models 134, 136 in association with optimization operations 138, 140 and model summary scores 142, 144. For example, the optimization operations 138, 140 and/or the model summary scores 142 may be stored as metadata for the models 134, 136. The computing device 102 may identify the similar model 130 as a model 134, 136 within the database 106 with a similar model summary score 142, 144. For example, the model summary scores 142, 144 may be calculated for the models 134, 136 (e.g., may be previously generated) using techniques similar to those discussed above in calculating the model summary score 128. As one specific example, where the model summary score 128 is calculated as a fuzzy hash of the categorized operations 112, 114, 118, the similar model 130 may be identified as a model 134, 136 within the database 106 with the most similar hash value (e.g., the hash value that deviates the least from the model summary score 138). Similarity between the model summary score 128 and the model summary scores 142, 144 may be computed according to a difference measure (e.g., a quantity of differing digits, a total difference in value magnitude). For instance, determining the difference measure may include determining a number of digits in the model summary scores 142, 144 (e.g., a fuzzy hash of the models) that are different from one another (e.g., where fewer different digits indicates a greater similarity between two models). As another example, the model summary score 128 may include a summary of the quantity of operations in each of the predefined categories, and the similar model 130 may be identified as the result identified based on a classifier search (e.g., a nearest neighbor search, a random classifier search) of the model summary scores 142, 144. In certain implementations, multiple model summary scores may be calculated for each of the models 134 (e.g., based on different levels of abstractions for the operations contained within the models 134, 136). In such instances, a model summary scores 128 at a particular level of abstraction may be compared to the model summary scores 142, 144 at the same level of abstraction.

The database 106 also stores optimization operations 138, 140 in association with the models 134, 136. The optimization operations 138, 140 may include operations performed (e.g., by a technician) on the models 134, 136 when deploying the models 134, 136. For example, the optimization operations 138, 140 may include one or more of removing a neural node from the model 110, adding a neural network node to the model 110, adding an operation to the model 110, removing an operation from the model 110, and substituting an operation within the model 110. The computing device 102 may be configured to identify an optimization operation 132 for the model 110. For example, the computing device 102 may identify the optimization operation 132 as an optimization operation corresponding to the similar model 130 within the database 106. In particular, where the similar model 130 was optimized by removing a two-dimensional convolution, the optimization operation

132 may include removing a two-dimensional convolution operation from the model 110.

The computing device 102 may apply the optimization operation 132 to the model 110 to generate an updated model 133 and may deploy the updated model 133 within the computing environment 104. Deploying the updated model 133 within the computing environment 104 may include transmitting the updated model 133 (e.g., source code for the updated model 133, a compiled version of the updated model 133) to the computing environment 104. In certain instances, deploying the model 110 may include identifying corresponding computing hardware 158 within the computing environment 104 that should be used to execute the updated model 133. For example, where one or more operations 116 were assigned an excluded status 124 from the model summary score 128 calculation (e.g., as Tensor-Flow functions), deploying the model may include adding metadata to the updated model 133 or another indication that the updated model 133 should be implemented using TPUs from the computing hardware 158. The computing environment 104 may then execute the updated model 133 to provide the one or more functions offered by the trained model 110.

One or more of the computing device 102, the computing environment 104, and the databases 106, 108 may be implemented by a computing system. For example, although not depicted, the computing device 102, the computing environment 104, and/or the databases 106, 108 may include a memory and/or a processor configured to implement one or more operational features. For example, the memory may store instructions which, when executed by the processor, cause the processor to implement one or more operational features of the computing device 102, the computing environment 104, and the databases 106, 108. Additionally or alternatively, one or both of the databases 106, 108 may be implemented as a single database and/or as multiple databases. Additionally or alternatively, the computing device 102 and/or the databases 106, 108 may be at least partially implemented by the computing environment 104. For example, the computing device 102 and/or the databases 106, 108 may be implemented as a virtual machine or application executing within the computing environment 104. Furthermore, communication between the computing device 102, the computing environment 104, and/or the databases 106, 108 may occur via a network connection. For example, the computing device 102, the computing environment 104, and/or the databases 106, 108 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1, and/or a global network (e.g., the Internet).

Figure 2:
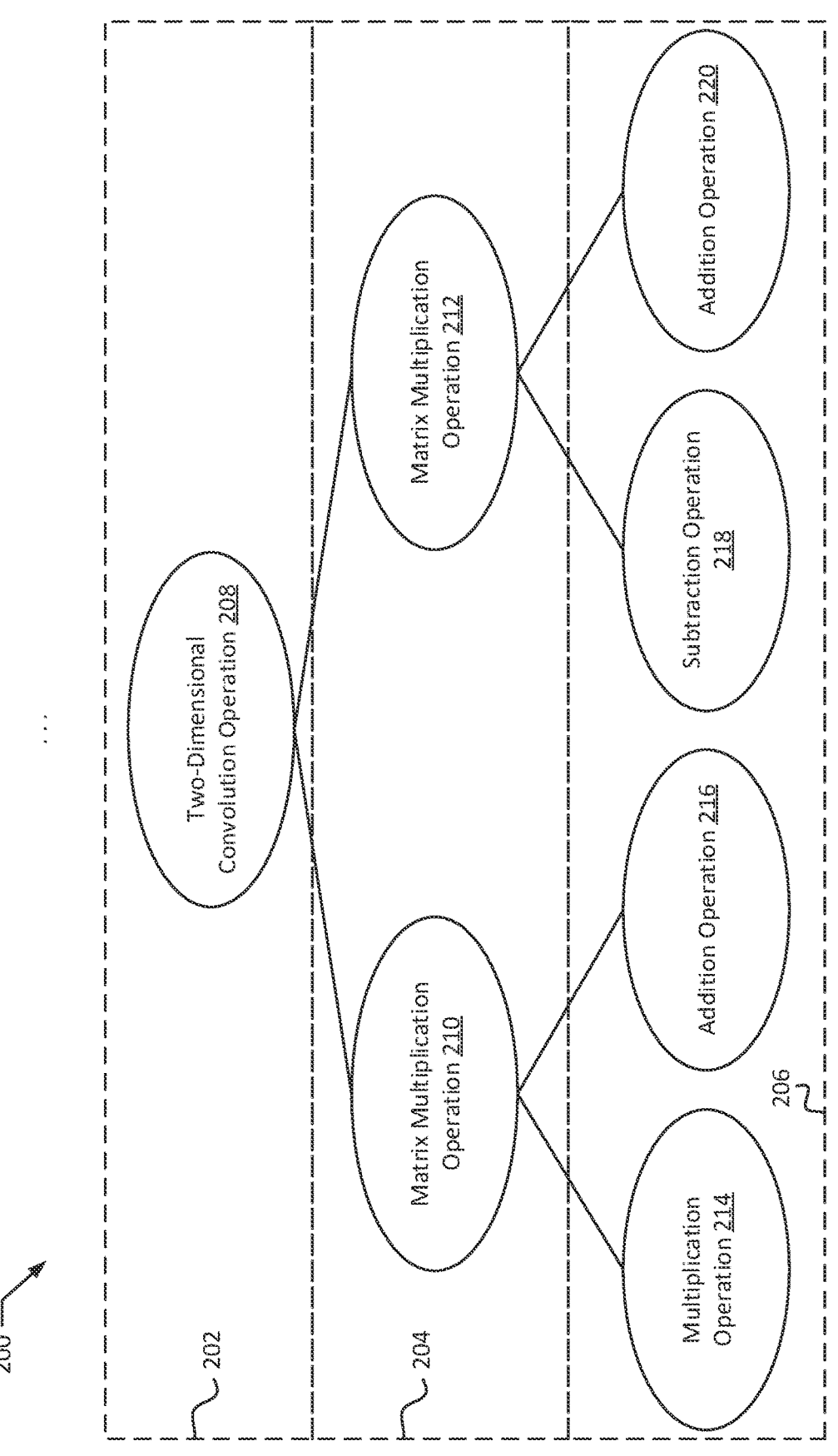
FIG. 2 illustrates an operation hierarchy according to an exemplary embodiment of the present disclosure.

FIG. 2 illustrates an operation hierarchy 200 according to an exemplary embodiment of the present disclosure. The operation hierarchy 200 depicts a two-dimensional convolution operation 208 at multiple levels of abstraction 202, 204, 206. In particular, a two-dimensional convolution operation 208 may itself be formed from multiple computational operations performed by a computing device or computing hardware performing the two-dimensional convolution operation 208. Accordingly, the two-dimensional convolution operation 208 represents a first level of abstraction 202. However, at a lower level of abstraction 204, the two-dimensional convolution operation 208 may include additional operations, such as matrix multiplication operations 210, 212. At a yet lower level of abstraction 206, the matrix multiplication operations 210, 212 may themselves involve multiple computation operations. For example, at the lower level of abstraction 206, the matrix multiplication operation 210 includes at least an additional multiplication operation 214 and an addition operation 216 and the matrix multiplication operation 212 includes a subtraction operation 218 and an addition operation 220. In practice, the two-dimensional convolution operation 208 and/or the matrix multiplication operations 210, 212 may themselves comprise additional operations that are not depicted.

Based on the above examples, it should be understood that one or more of the above-discussed techniques may be performed at different levels of abstraction. For example, a model summary score 128 may be calculated at a particular level of abstraction. In particular, operations and categories for a received model may be identified based on a designated level of abstraction. For example, at the level of abstraction 204, the computing device 102 may be configured to identify matrix multiplication operations and/or other matrix manipulation processes. Additionally or alternatively, a model summary score may be calculated at a higher level of abstraction 202, where the computing device 102 may be configured to identify convolution operations and other high-level operations, such as optimization operations (e.g., gradient descent operations) and to ignore lower-level operations. In certain implementations, multiple model summary scores 128 may be calculated at multiple levels of abstraction 202, 204, 206. For example, the computing device 102 may calculate a separate model summary score at each of a plurality of predefined levels of abstraction. In such instances, categories may be assigned at varying levels of abstraction. Accordingly, the database 108 may store information identifying a particular level of abstraction for a received operation, which may be included within the categories 120, 122, 126 assigned to identified operations.

Figure 3:
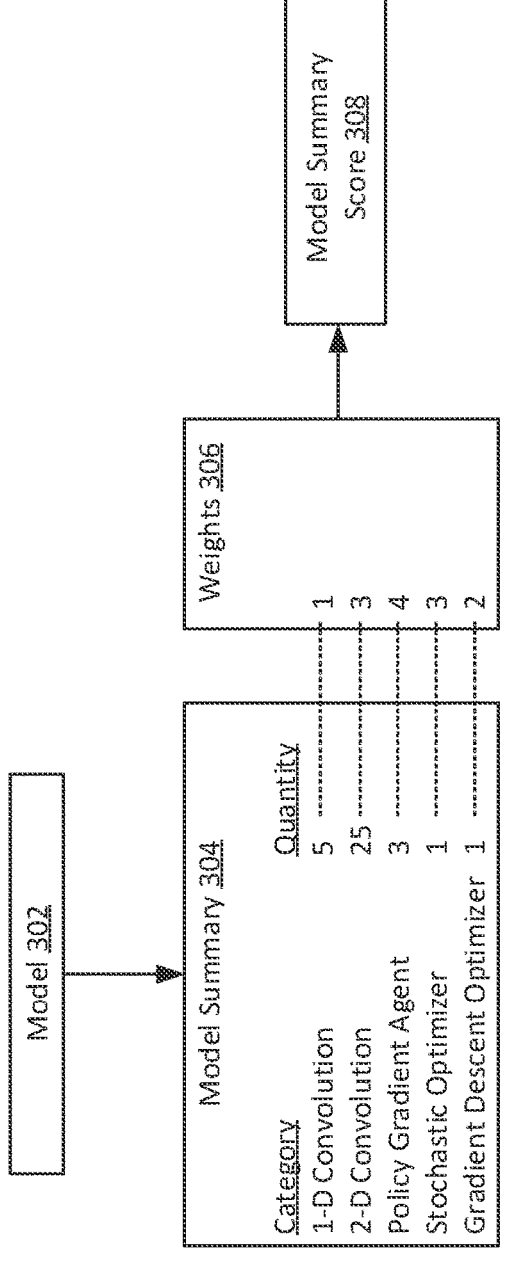
FIG. 3 illustrates a model summary score calculation according to an exemplary embodiment of the present disclosure.

FIG. 3 illustrates a model summary score calculation procedure 300 according to an exemplary embodiment of the present disclosure. The model summary score calculation procedure 300 may be performed to calculate a model summary score 308 for a received model 302. For example, the model summary score calculation procedure may be an exemplary implementation of calculating a model summary score 128 by the computing device 102. In particular, the model 302 may be an exemplary implementation of the model 110 and the model summary score 308 may be an exemplary implementation of the model summary score 128.

The model summary 304 is determined based on the model 302. In particular, the model summary 304 includes a summary of the different categories of operations within the model 302. The model summary 304 may be determined by extracting and categorizing operations from the model 302 using techniques similar to those discussed above in connection with the system 100. The model summary 304 indicates that 5 operations were categorized as one-dimensional convolution operations, 25 operations were categorized as two-dimensional convolution operations, 3 operations were categorized as policy gradient agents, 1 operation was categorized as a stochastic optimizer operation, and 1 operation was categorized as a gradient descent optimizer operation.

The model summary score 308 may be calculated based on the quantity of different categories of operations within the model summary 304. For example, the model summary score 308 may be based on a weighted combination of the quantities indicated by the model summary 304. In particular, the weights 306 specify how the different categories of operations may be weighted to generate the model summary score 308. For example, the weights 306 may be higher for categories of operations that are more likely to differentiate different types of models and/or that are more likely to indicate models with similar types of optimizations. For example, higher weights may be assigned to more computationally intense operations, to indicate a higher potential for computational optimization. As depicted, the weights 306 indicates a weight of 1 for the one-dimensional convolution operations, a weight of 3 for two-dimensional convolution operations, a weight of 4 for policy gradient agent operations, a weight of 3 for stochastic optimizer operation, and a weight of 2 for gradient descent optimizer operations.

A computing device may apply the weights 306 to the quantities for each of the categories in the model summary, and the resulting quantities may be used to generate the model summary score 308. For example, the model summary score may be a fuzzy hash of the model summary 304 with the weighted quantities. In particular, a fuzzy hash may be calculated based on an identifier of each category and the weighted quantity of operations within each category. In additional or alternative implementations, the model summary score 308 may be a collection of features that identify the model 302. In particular, the model summary score 308 may be a feature vector combining the categories indicated in the model summary 304 with corresponding weighted quantities calculated based on the weights 306. As explained above, these model summary scores may be used to identify similar models within a database. These similar models may in turn be used to identify optimization operations that can be applied to the model 302 before deployment.

FIG. 4 illustrates a method 400 for optimizing models based on model similarity measurements according to an exemplary embodiment of the present disclosure. The method 400 may be implemented on a computer system, such as the system 100. For example, the method 400 may be implemented by the computing device 102, the computing environment 104, and/or the databases 106, 108 the method 400 may also be implemented by a set of instructions stored on a computer readable medium that, when executed by a processor, cause the computer system to perform the method 400. For example, all or part of the method 400 may be implemented by processors and/or memories of the computing device 102, the computing environment 104, and/or the databases 106, 108. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a model for deployment in a computing environment (block 402). For example, a computing device 102 may receive a model 110, 302 for deployment in a computing environment 104. The model 110, 302 may be received as a trained model (e.g., a model that has been trained on one or more data sets to perform a particular function). In particular, the model 110, 302 may be received from a computing device used to train or otherwise configure training of the model 110, 302. For example, the model 110, 302 may be received as source code or executable code from another computing device.

A plurality of operations may be extracted from the model (block 404). For example, the computing device 102 may extract a plurality of operations 112, 114, 116, 118 from the model 110, 302. The operations 112, 114, 116, 118 may be extracted using one or more keyword, feature recognition, sequence recognition, or similar techniques within the source code and/or executable code for the model 110, 302. For example, as explained above, the operations 112, 114, 116, 118 may be extracted as function calls within a source code for the model 110, 302. The operations extracted may include one or more of a neural network neuron, a one-dimensional convolution operation, a two-dimensional convolution operation, matrix manipulation operations, mathematical CPU operations, optimizer operations. In one specific example, an operation extracted from the model 110, 302 may include a TensorFlow stochastic gradient descent optimizer called by the model 110, 302.

The plurality of operations may be categorized based on a plurality of predefined operation categories to form a plurality of categorized operations (block 406). For example, the computing device 102 may categorize the operations 112, 114, 116, 118 based on a plurality of predefined categories 120, 122, 126, 150, 152. As explained above, the predefined categories used to categorize the operations may include operations at different levels of abstraction. In certain implementations, the computing device 102 may be configured to categorize operations at a single level of abstraction (e.g., to identify convolution and optimizer operations within the model 110, 302). In additional or alternative implementations, the computing device 102 may be configured to categorize operations at multiple levels of abstraction (e.g., to identify convolution and optimizer operations within the model 110, 302 and to identify matrix manipulation operations within the model 110, 302). In one specific example, the TensorFlow stochastic gradient descent optimizer may be assigned a category at a higher level of abstraction as an "optimizer," at a lower level of abstraction as a "stochastic optimizer," and/or at a still lower level of abstraction as a "stochastic gradient descent optimizer." In certain implementations, as explained further above, categorizing the operations 112, 114, 116, 118 may include assigning an excluded status 124 to certain operations 116 based on the computing hardware 158 within the computing environment 104.

A model summary score may be computed based on the categorized operations (block 408). For example, the computing device 102 may compute a model summary score 128, 308 based on the categorized operations 112, 114, 118 (e.g., a model summary 304). As explained above, the model summary score 128, 308 may be calculated as a fuzzy hash of the quantity of operations in the predefined categories. Additionally or alternatively, the model summary score 308 may be an indication (e.g., a feature vector) of quantities (or weighted quantities) of operations in the predefined categories.

At least one similar model may be identified within a database based on the model similarity score (block 410). For example, the computing device 102 may identify at least one similar model 130 within a database 106 based on the model similarity score 128. In particular, the computing device 102 may compare the model summary score 128 to model summary scores 142, 144 of models stored within the database 106. In one specific example, where the model summary score 128 is calculated as a fuzzy hash, the computing device 102 may calculate a difference measure between the model summary score 128 and the model summary scores 142, 144 for models 134, 136 stored within the database 106. The similar model 130 may be identified as the model with the smallest difference from the model summary score 128 or may be identified as the model with a difference below a predetermined threshold. As another specific example, where the model summary score 128 is calculated as a feature vector of the quantities of operations in various categories, the similar model 130 may be identified based on a classifier search of the model summary scores 142, 144 within the database 106. In certain implementations, the computing device 102 may be configured to identify more than one similar model 130. In such implementations, the similar model 130 may be based on a desired quantity of similar models (e.g., the five closest models) and/or based on a maximum difference between model summary scores.

The model may be updated based on an optimization operation performed on the at least one similar model (block 412). For example, the computing device 102 may update the model 110, 302 based on an optimization operation 132 performed on the at least one similar model 130. In particular, the database 106 may store optimization operations 138, 140 performed on the models 134, 136 stored within the database 106. The optimization operation 132 may be identified as corresponding to the similar model 130 within the database 106. The computing device 102 may select the optimization operation 132 and may apply the optimization operation 132 to the model 110, 302 to generate the updated model 133. In certain implementations, the optimization operation 132 may be selected based on the operations 112, 114, 116, 118 within the model 110, 302. Continuing the example where the operation 118 is a TensorFlow stochastic gradient descent optimizer, the similar model 130 may have a corresponding optimization operation 132 that replaced a similar operation with a different type of optimizer (e.g., an adaptive moment estimation optimizer). Because the model 110, 302 has a similar operation, the optimization operation 132 may be selected and applied to the model 110, 302 to replace the TensorFlow stochastic gradient descent optimizer with an adaptive moment estimation optimizer. In certain implementations, where multiple similar models 130 are identified and/or where the similar model 130 has multiple corresponding optimization operations 132, more than one optimization operation may be applied to the model 110, 302 to generate the updated model 133.

The model may be deployed within the computing environment (block 414). For example, the updated model 133 may be deployed within the computing environment 104. Deploying the updated model 133 may include transmitting a copy of the updated model 133 to the computing environment 104 and/or selecting between different computing hardware 158 available within the computing environment 104 (e.g., based on the excluded operations 116).

In this manner, the method 400 enables the automated identification of similar machine learning models stored within a database. In particular, by computing a model summary score based on categorized operations of a model, the method 400 enables similar models that may be implemented using different API or software libraries to still be identified if they use similar types of operations (e.g., similar numbers of convolutions, similar types of optimizers, and the like). Furthermore, by selecting optimization operations that correspond to similar models, the computing device 102 is able to automatically update and optimize models to reduce processing time and/or computing resources within a computing environment 104. Accordingly, the method 400 improves the responsiveness and/or the number of predictive models that can be deployed within the computing environment 104.

Figure 5:
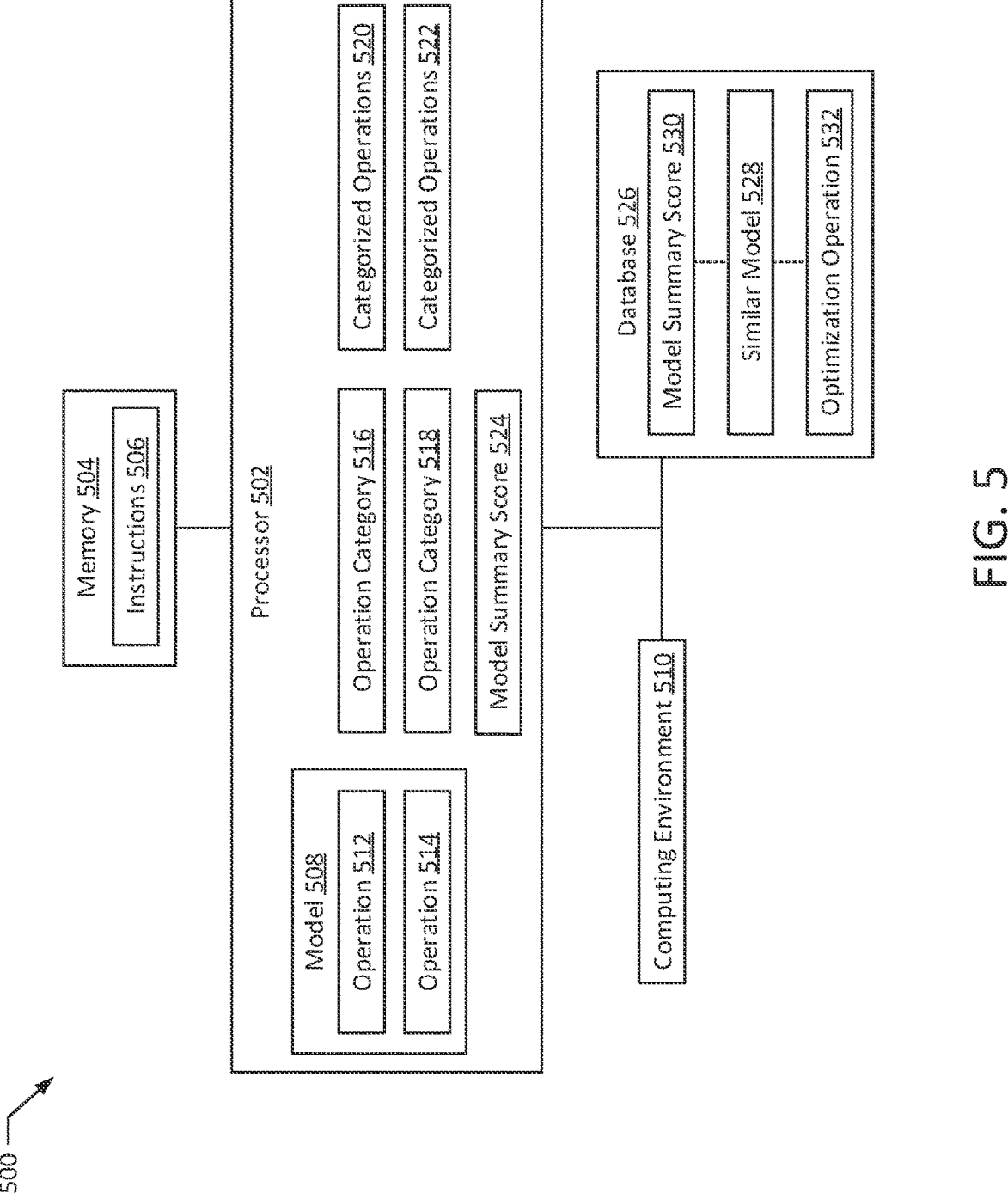
FIG. 5 illustrates a system according to an exemplary embodiment of the present disclosure.

FIG. 5 illustrates a system 500 according to an exemplary embodiment of the present disclosure. The system 500 includes a processor 502 and a memory 504. The memory 504 stores instructions 506 which, when executed by the processor 502, cause the processor 502 to receive a model 508 for deployment in a computing environment 510 and extract a plurality of operations 512, 514 from the model 508. The instruction 506 may further cause the processor 502 to categorize the plurality of operations 512, 514 based on a plurality of predefined operation categories 516, 518 to form a plurality of categorized operations 520, 522 and compute a model summary score 524 based on the categorized operations 520, 522. The instructions may also cause the processor 502 to identify, within a database 526, at least one similar model 528 with a similar model summary score 530. The instructions 506 may still further cause the processor 502 to update the model 508 based on an optimization operation 532 performed on the at least one similar model and deploy the model 508 within the computing environment 510.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving, by one or more processors, a first machine-learning model for deployment in a computing environment;
   extracting, by the one or more processors, a plurality of operations from source code of the first machine-learning model, wherein the plurality of operations are computational suboperations performed by the first machine-learning model to facilitate an overall objective of the first machine-learning model;
   based on extracting the plurality of operations from the source code of the first machine-learning model, categorizing, by the one or more processors, the plurality of operations into a plurality of predefined operation categories to form a plurality of categorized operations;
   computing, by the one or more processors, a first model summary score based on the plurality of categorized operations;
   identifying, by the one or more processors and within a database, a second machine-learning model for use in an optimization process, wherein the second machine-learning model is identified for use in the optimization process by:
   comparing the first model summary score to a set of model summary scores corresponding to a set of machine-learning models in the database; and selecting the second machine-learning model for use in the optimization process based on the second machine-learning model having a second model summary score that is within a predefined range of the first model summary score;
   based on identifying the second machine-learning model for use in the optimization process, identifying, by the one or more processors, an optimization operation, from among a plurality of optimization operations, that was performed on the second machine-learning model;
   based on identifying the optimization operation performed on the second machine-learning model, updating, by the one or more processors, the first machine-learning model by executing the optimization operation on the first machine-learning model, to thereby improve operation of the first machine-learning model; and
   after updating the first machine-learning model to improve the operation thereof, deploying, by the one or more processors, the first machine-learning model within the computing environment.

2. The method of claim 1, wherein the plurality of predefined operation categories includes at least one category selected from the group consisting of types of neural network neurons used, types of connections between neural network neurons, one-dimensional convolution operations, two-dimensional convolution operations, matrix multiplication, mathematical CPU instructions, and types of optimizers.

3. The method of claim 1, wherein categorizing the plurality of operations further comprises:
   excluding, by the one or more processors, at least one operation from the plurality of operations based on the at least one operation already being optimized for computing hardware of the computing environment.

4. The method of claim 1, wherein deploying the first machine-learning model further comprises:
   selecting, by the one or more processors, computing hardware from the computing environment based on the categorized operations; and
   deploying, by the one or more processors, the first machine-learning model on the selected computing hardware.

5. The method of claim 1, wherein the first model summary score is computed based on a quantity of categorized operations in at least one subset of the predefined operation categories.

6. The method of claim 5, wherein the first model summary score is computed based on weights assigned to each of the at least one subset of the predefined operation categories.

7. The method of claim 5, further comprising:
   identifying, by the one or more processors, the second machine-learning model based on a classifier search for machine-learning models with similar quantities of the at least one subset of the predefined operation categories.

8. The method of claim 1, wherein the first model summary score is calculated based on a fuzzy hash of the categorized operations.

9. The method of claim 8, wherein the second machine-learning model is identified based on a similar fuzzy hash value.

10. The method of claim 1, wherein computing the first model summary score comprises computing multiple scores at multiple levels of abstraction for the plurality of operations.

11. The method of claim 1, wherein the optimization operation is identified based on metadata stored in association with the second machine-learning model.

12. The method of claim 1, wherein the optimization operation includes at least one optimization operation selected from the group consisting of removing a neural network node from the first machine-learning model, adding a neural network node to the first machine-learning model, adding an operation to the first machine-learning model, removing an operation from the first machine-learning model, and substituting an operation within the first machine-learning model.

13. A system comprising:

a processor; and a memory storing instructions which, when executed by the processor, cause the processor to:

receive a first machine-learning model for deployment in a computing environment;

extract a plurality of operations from source code of the first machine-learning model, wherein the plurality of operations are computational suboperations performed by the first machine-learning model to facilitate an overall objective of the first machine-learning model;

based on extracting the plurality of operations from the source code of the first machine-learning model, categorize the plurality of operations into a plurality of predefined operation categories to form a plurality of categorized operations;

compute a first model summary score based on the plurality of categorized operations;

identify, within a database, a second machine-learning model for use in an optimization process, wherein the second machine-learning model is identified for use in the optimization process by:

comparing the first model summary score to a set of model summary scores corresponding to a set of machine-learning models in the database; and selecting the second machine-learning model for use in the optimization process based on the second machine-learning model having a second model summary score that is within a predefined range of the first model summary score;

based on identifying the second machine-learning model for use in the optimization process, identify an optimization operation, from among a plurality of optimization operations, that was performed on the second machine-learning model;

based on identifying the optimization operation performed on the second machine-learning model, update the first machine-learning model by executing the optimization operation on the first machine-learning model, to thereby improve operation of the first machine-learning model; and after updating the first machine-learning model to improve the operation thereof, deploy the first machine-learning model within the computing environment.

14. The system of claim 13, wherein the memory stores further instructions which, when executed by the processor while categorizing the plurality of operations, cause the processor to:

exclude at least one operation from the plurality of operations based on the at least one operation already being optimized for computing hardware of the computing environment.

15. The system of claim 13, wherein the first model summary score is computed based on at least one of (i) a quantity of categorized operations in at least a subset of the predefined operation categories and (ii) a fuzzy hash of the categorized operations.

16. The system of claim 13, wherein the optimization operation includes at least one optimization operation selected from the group consisting of removing a neural network node from the first machine-learning model, adding a neural network node to the first machine-learning model, adding an operation to the first machine-learning model, removing an operation from the first machine-learning model, and substituting an operation within the first machine-learning model.

17. A non-transitory, computer-readable medium storing instructions which, when executed by a processor, cause the processor to:

receive a first machine-learning model for deployment in a computing environment;

extract a plurality of operations from source code of the first machine-learning model, wherein the plurality of operations are computational suboperations performed by the first machine-learning model to facilitate an overall objective of the first machine-learning model;

based on extracting the plurality of operations from the source code of the first machine-learning model, categorize the plurality of operations into a plurality of predefined operation categories to form a plurality of categorized operations;

compute a first model summary score based on the plurality of categorized operations;

identify, within a database, a second machine-learning model for use in an optimization process, wherein the second machine-learning model is identified for use in the optimization process by:

comparing the first model summary score to a set of model summary scores corresponding to a set of machine-learning models in the database; and selecting the second machine-learning model for use in the optimization process based on the second machine-learning model having a second model summary score that is within a predefined range of the first model summary score;

based on identifying the second machine-learning model for use in the optimization process, identify an optimization operation, from among a plurality of optimization operations, that was performed on the second machine-learning model;

based on identifying the optimization operation performed on the second machine-learning model, update the first machine-learning model by executing the optimization operation on the first machine-learning model, to thereby improve operation of the first machine-learning model; and after updating the first machine-learning model to improve the operation thereof, deploy the first machine-learning model within the computing environment.

18. The method of claim 1, wherein the optimization operation involves adjusting an architecture of the first machine-learning model.

19. The method of claim 1, wherein the first machine-learning model includes a neural network, a linear regression model, a decision tree model, a random forest model, a naive Bayes model, or a logistic regression model.

20. The method of claim 1, further comprising:

accessing, by the one or more processors, a stored table that maps optimization operations to machine-learning models, wherein stored table includes a mapping of the optimization operation to the second machine-learning model; and identifying, by the one or more processors, the optimization operation based on its mapping to the second machine-learning model in the stored table.

\* \* \* \* \*